United States Patent [19]

Brandolf

[11] Patent Number: 4,802,509
[45] Date of Patent: Feb. 7, 1989

[54] WRAPAROUND CLOSURE FOR CONDUIT PROTECTION

[76] Inventor: Henry E. Brandolf, 1 Quiet Ct., Miller Place, N.Y. 11764

[21] Appl. No.: 133,074

[22] Filed: Dec. 15, 1987

[51] Int. Cl.⁴ ............................................. F16L 57/00
[52] U.S. Cl. ..................................... 138/110; 138/99; 138/178; 138/DIG. 1; 428/99; 428/34.9; 156/86; 174/DIG. 8
[58] Field of Search ................... 138/99, 97, 110, 177, 138/178, DIG. 1; 428/36, 99, 40, 349; 174/DIG. 8; 156/86

[56] References Cited

U.S. PATENT DOCUMENTS

| | | |
|---|---|---|
| 3,770,556 | 11/1973 | Evans et al. |
| 3,847,721 | 11/1974 | Evans ........................... 174/DIG. 8 |
| 3,959,052 | 5/1976 | Stanek . |
| 4,153,747 | 5/1979 | Young et al. |
| 4,200,676 | 4/1980 | Caponigro et al. .......... 174/DIG. 8 |
| 4,268,559 | 5/1981 | Smuckler . |
| 4,359,502 | 11/1982 | Caponigro et al. |
| 4,392,898 | 7/1983 | Pithouse et al. |
| 4,413,656 | 11/1983 | Pithouse ........................ 174/DIG. 8 |
| 4,424,246 | 1/1984 | Pieslak et al. |
| 4,472,468 | 9/1984 | Tailor et al. .................. 174/DIG. 8 |
| 4,532,168 | 7/1985 | Steele et al. ................. 174/DIG. 8 |
| 4,586,971 | 5/1986 | Wallace ........................ 174/DIG. 8 |
| 4,731,272 | 3/1988 | Meltsch ..................... 174/DIG. 8 X |

FOREIGN PATENT DOCUMENTS 1514924  6/1978  United Kingdom ......... 174/DIG. 8

Primary Examiner—James E. Bryant, III
Attorney, Agent, or Firm—Hall, Myers & Rose

[57] ABSTRACT

Provided herein is a wraparound closure sleeve for environmentally sealing conduits employing a heat-recoverable sheet oriented to shrink in the direction of its width, a first strip of self-amalgamating material disposed along or near one edge of the sheet and perpendicular to the direction of orientation, a mastic or hot-melt adhesive coated on the remaining surface area of the sheet, a second self amalgamating strip disposed parallel to the first strip on the opposite surface of the sheet where wrapping the sheet around the conduit, juxtaposing the strips and pressing them together forms a lap bond having sufficient lap shear strength to resist the hoop stress force generated by shrinking of the oriented sheet around the conduit and the mastic/adhesive is pressed and flows between the conduit and sheet.

5 Claims, 1 Drawing Sheet

WRAPAROUND CLOSURE FOR CONDUIT PROTECTION

BACKGROUND OF THE INVENTION

The advent of heat-recoverable, thermoplastic materials generated a new industry producing articles of such materials for conduit protection. Conduits, such as electrical cabling, pipes and fluid passageways generally require protection against adverse environmental elements (water, corrosive chemicals, etc.). These considerations have led to the development of a host of heat-recoverable, thermoplastic closures and sleeves.

A common characteristic of heat-recoverable closure sleeves is that they have been oriented or stretched in order to induce the shape-memory shrinking which enable the closures to conform to the specific contours and dimensions of the conduit surface. The construction and function of these sheets permit the field worker to wrap a sheet around a conduit at any portion therealong, shrinking the covering sheet to seal the conduit against environmental elements by application of heat. The single, most important feature of most closures is this establishment of a reliable environmental seal. In the case of wraparound sleeves, structures incorporate button-type edge joints, rail and channel edge joints, etc., in order to achieve the intended sealing function. Oftentimes, however, during the course of heat application, the junction of the two edges or the overlap of the wraparound sheet separate as a result of the hoop stress induced during the shrinking process. The hoop stress overcomes the sealing or joining mechanism employed to secure the overlapping edges of the closure sleeve. When such separation occurs, the purpose of the sleeve is defeated, virtually in its entirety.

A further consideration relating to such sleeves is ease of installation. Often, in field installation, two persons are required to effect application of a closure sleeve. One applies the heat necessary to induce shrinking while the other holds the sleeve in position. Alternatively, adjunctive equipment may be substituted for the holder but this delays installation where the installer must first dedicate time and effort to apply such equipment.

Lap shear, for the purpose of this application, will be understood as a measurement of force required to separate a joint formed by the overlapping of two edges of a wraparound sleeve.

Hoop stress is defined as a measurement of the tangential force generated during recovery of a shape-memory material. More particularly, in this case, it represents the shrinking force in the direction of orientation induced upon application of heat at recovery temperature of the polymeric material employed in the heat-recoverable sheet component of the sleeve contemplated by this invention.

SUMMARY OF THE INVENTION

It is an object of this invention to provide a wraparound, heat-shrinkable conduit protection sleeve enabling the formation of a reliable environmental seal for the conduit underlying the sleeve.

It is another object of this invention to provide a wraparound sleeve and method for its use where the sleeve may be applied easily in the field with a minimum of labor.

A further object of the invention is to provide a wraparound sleeve and method for its use where the overlapping joint possesses sufficient lap shear strength to overcome the hoop stress induced by the recovery of the heat-shrinkable material.

These and other objects of the invention are satisfied by a wraparound closure for conduit protection, comprising a substantially planar sheet of plastic material having shape memory, being heat recoverable at transition temperature T°, and having upper and lower surfaces; a mastic layer disposed on the upper surface of said sheet said layer being composed of an adherent material selected from the group of mastic, heat-activated adhesive material being activated at a temperature below T°, said adherent material being coated on the upper surface of said sheet; a first strip of self-amalgamating material disposed on said upper sheet surface where said self fusing material and said adherent material are of substantially equal thickness to provide a continuous layer on said upper surface of substantially uniform thickness, said self-amalgamating material comprising a cross-linked blend of polymers and being capable of fusing together, a second strip of self-amalgamating material complementary to said first strip positioned on said lower sheet surface to mate and fuse with said first strip when said sheet is wrapped around a tubular conduit and said first and second strips are juxtaposed and pressed together where application of heat to a temperature of T° causes said sheet to shrink about the conduit and the adherent material bond thereto.

Additional objects are satisfied by a method for providing a wraparound closure for a conduit characterized by a sheet of oriented, shape-memory, heat-recoverable plastic material having on one surface, a mastic or hot-melt adhesive material and a first strip of self-amalgamating material, being perpendicularly disposed to the direction of orientation, the sheet having on the opposite surface a second strip of self-amalgamating material being parallelly disposed to the first strip, the method including the steps of wrapping the closure around the conduit in a manner where the first and second strips of self-amalgamating material are juxtaposed, pressing the strips together to enable fusion thereof; heating the closure to a temperature to induce recovery of the sheet along the direction of orientation and to actuate said mastic to bind the sheet to the conduit.

DETAILED DESCRIPTION OF THE ILLUSTRATED EMBODIMENTS

Figure 1:
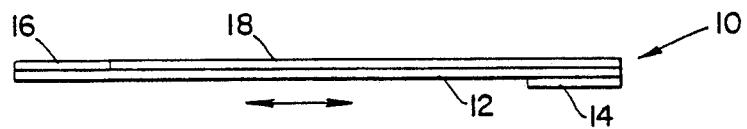
FIG. 1 discloses an end view of a first embodiment of the invention.

Closure sleeve 10, illustrated in FIG. 1, includes oriented heat-shrinkable sheet 12, self-amalgamating strips 14 and 16 parallelly disposed to one another, perpendicular to the direction of orientation of sheet 12 and positioned along the upper and lower surfaces of sheet 2. Sleeve 10 also incorporates heatactivated, flowable mastic/adhesive layer 18 along its upper surface which is of similar thickness as strip 14 where the upper surface of sheet 12 is substantially continuous and planar.

Sheet 12 may be composed of any known heatrecoverable, shape-memory material such as cross-linked polyolefins, vinyl acetate polymers, etc. An exemplary material is the polymer blend disclosed in U.S. Pat. No. 4,310,367 incorporated herein by reference for this purpose. Sheet 12 is oriented (stretched) in the direction of the arrow so as to shrink widthwise relative to the illustration. Typically, in commercial processing, sheet 12 is stretched 1.3 to 1.7 times (130-170%) its original dimensional width. However, it has been found that orientation even to three times (300%) the original dimensions is possible in this invention. In the case of electrical cable generally having a ½ inch to 5 inch outer diameter, sheet 12 will be 1.6-16 inches wide and an unoriented thickness of approximately 90 mils. Where employed as pipe wrap, pipes generally having an outer diameter of 2-60 inches, sheet 12 will have a thickness of approximately 45 mils and a width of 6-200 inches.

The composition of layer 18 is selected for its intended use but generally is ordinary mastic or coventional hot-melt adhesive. Its purpose is to flow onto the underlying conduit providing an environmental seal between sheet 12 and the conduit. Skilled artisans recognize the preference for mastic in a petroleum (oil or gas) environment and hot-melt adhesives in a telecommunications environment. Butyl-based mastic such as Novatherm A-25 produced by Norton Corporation of Grandville, N.Y., has been found suitable for the invention while numerous commercially available heat-activated hot-melt adhesives are readily employable for ease of handling and installation. One principal consideration in that case is that the activation temperature be less than the transition temperature of sheet 12. In other words, the adhesive must be rendered flowable before heat-shrinking is effected. Commercially available polyamide or ethylene vinyl acetate/polyethylene blend hot-melt adhesives are appropriate for use in this invention. It is also particularly desirable that the hot-melt adhesive exhibit two-stage transitions. That is, during the first stage the adhesive becomes flowable at a low temperature and that during high temperature sealing procedures, described below, second stage wetting out occurs.

As already noted, it is desirable that the thickness of layer 18 be equal to that of strip 14. Furthermore, layer 18 should cover the entire upper surface of sheet 12, excepting strip 14, to prevent the formation of voids between sheet 12 and the underlying conduit.

Thermally self-fusing (self-amalgamating) strips 14 and 16 are disposed along the peripheral edge of sheet 12 and perpendicular to the direction of orientation (i.e. width of sheet 12). Contingent on application, strips 14 and 16 may be 1 inch to 4 inches wide and extend the entire length of sleeve 12. The width of strips 14 and 16 is determined by the requirements for lap shear strength in order to overcome the hoop stress induced from heat shrinking of sheet 12 (the wider the sleeve, the greater hoop stress). Strips 14 and 16 are capable of self-amalgamation so that when juxtaposed and pressed against each other they fuse to form a substantially unitary overlapped structure in a minimum of time. Accordingly, when so fused, the bond between strips 14 and 16 has tremendous lap shear strength which seriously reduces the separability of the overlapped portion. Thus, when pressed together, the strips allow sleeve 10 to define a tubular structure which is not easily pulled apart. In the context of field application, this allows the installer to position and secure sleeve 10 around a conduit and fix its dimensions with a minimum of effort. Then the worker may apply sufficient heat to shrink sleeve 12 without fear of separation of the overlap.

In the context of manufacture, it has been found that strips 14 and 16 may be formed integrally with sheet 12 by coextrusion processes. Alternatively, strips 14 and 16 may be glued to sheet 12 with a suitable adhesive (epoxy for example). For the purposes of this invention, many commercially available self-amalgamating materials (heat-activated or not) can be employed so long as the physical characteristics described herein are satisfied. Of course, a particular composition may prove preferential to another for a particular task. As such, the selection of the self-amalgamating strips may be governed by the requirements of a specific situation. The thermally self-fusing or amalgamating strips can be composed of materials which exhibit the properties of self-amalgamation, good tensile strength, good percent elongation, high-tear strength, and high-peel strength. Examples of such materials providing the combination of these characteristics are now described. One satisfactory material as described by Anderson in United States Patent Application Ser. No. 842,248 filed Mar. 21, 1986 is composed of cross-linked blends of a conjugated diene butyl (CDB) rubber and polyolefin and blends of halo butyl rubber with a blend of linear low density polyethylene and Ethylene Propylene Diene Monomer (EPDM) rubber. The conjugated diene butyl rubber, contemplated for use in this invention, is disclosed in U.S. Pats. Nos. 3,775,387 and 3,816,371; both issued to Baldwin and the contents of which are incorporated herein by reference.

Referring to specific formulations for producing strips 14 and 16, the following composition was found to yield the desired physical characteristics:

42.26%—CDB-76 (Exxon Chemical Co.)
5.96%—Dow 2045 (Linear low density Polyethylene—Dow Chemical)
5.96%—Vistalon 1721 (EPDM—Exxon Chemical Co.)
13.55%—Vistanex LLMS (Polyisobutylene tackifier—Exxon Chemical Co.)
8.67%—Wingtack (Tackifir—Goodyear Rubber Co.)
21.13%—Carbon Black N550 1.88%—AC-6 (Wax-like dispersion agent for Carbon Black)
0.85%—Irganox 1010 (Antioxidant—Ciba Giegy Co.)

The components were mixed in a Banbury mixer at approximately 125° C.-130' C. for a sufficient time, generally less than 3 minutes, to achieve a uniform blend. The blend was extruded into 2 inch strips of 0.6 inch thickness onto a nylon carrier sheet and then exposed to a 4 Mrad dose of electron beam irradiation to cross-link the blend. It was found that cross-linking enhances the flow properties and high temperature stability of the strips.

Testing of the physical properties of this material yielded the following results:

|  | Modulus of Elasticity (100 M) psi | Tensile at Break psi | % Elongation psi |
|---|---|---|---|
| +50° | 29.40 | 99.55 | >480 |
| Room T 23° | 66.15 | 207.90 | 640 |
| 0° C. | 128.63 | 358.31 | >480 |
| −10° | 233.1 | 583.8 | >480 |
| −20° | 337.28 | 785.63 | >480 |
| −30° | 632.10 | 1380.98 | >480 |
| −40° | 1102.50 | 1388.33 | >480 |

-continued

| Tear Resistance Thickness (inches) | 500 mm/min Crosshead Speed Force (lbf) | Tear Resistance lbf/inch |
| --- | --- | --- |
| .069 | 4.30 | 62.32 |
| .067 | 4.19 | 62.54 |
| .071 | 4.43 | 62.39 |
| Shore "A" Hardness 42 | 10 sec. press | |

Due to the purpose of strips 14 and 16, a peel bond (lap shear) analysis was performed. This test quantified in pounds per linear inch, the lap shear strength of the strip material. The test involved cutting 5"×½" strips, folding the strips onto themselves, stretching the folded strip to 3 times its length, rolling the strips with a 10,000 gram weight and placing in oven at 150° C. for 3 minutes. This procedure assured amalgamation. The test was performed at 254 mm/min crosshead speed. The strips had a peel bond of 1.67 pli.

A second material providing the desired physical properites for the self-amalgamating strips is a crosslinked polymeric blend employing a halo butyl rubber. More particularly, Chlorobutyl Rubber 1165 available from Exxon Chemical Co. can be substituted for the CDB of Composition 1. The physical properties were somewhat inferior to those displayed by composition 1. The properties are tailorable by cross-linking the blend. Although peroxide-based chemical cross-linking is applicable, the preferred cross-linking means is ionizing irradiation. It was observed, that the degree of cross-linking in the blend had a measurable effect on the physical characteristics. Essentially, the tensile strength of the material is inversely proportional to the capacity for self-amalgamation.

In the case of the chlorobutyl rubber composition, fabricated strips exposed to a 4 Mrad electron beam dose from an appropriate source, such as a Dynamitron ® produced by Radiation Dynamics, Inc. of Melville, N.Y., exhibited non-uniform self-amalgamation but high tensile strength. A 2 Mrad dose yield good self-amalgamation and good tensile strength while no exposure resulted in excellent self-amalgamation but poor tensile strength and crack resistance. Accordingly, it appears that the capacity of self-amalgamation is inversely proportional to the degree of cross-linking. Therefore, to produce a usable sleeve employing chlorobutyl rubber, in the context of the invention, it is recommended that strips 14 and 16 be exposed to a 2 Mrad dose of electron beam irradiation.

As a final example of appropriate self-amalgamating strips for use in this invention is Rotunda 2515 and 2517, ethylene propylene rubber based products available from Rotunda PLC, Holland Street, Denton, Manchester, England. The difference between the 2515 and 2517 products is in thickness (0.020 and 0.030 inches, respectively. Otherwise, the products exhibit identical tensile strength (3.0 MN/m$^2$, 58 psi), elongation at break 800%, and a useful temperature range of $-40°$ C. to 100° C.

Moving now from the components, the reader's attention is directed to the installation of sleeve 10. The upper surface of sheet 12, that having strip 14 and layer 18, is placed on the outer conduit surface in a manner where strips 14 and 16 are juxtaposed. The strips are pressed together to induce self-amalgamation, i.e., forming a substantially unitary overlap. Heat of a temperature at least equal to the transition temperature of sheet 12 is applied to induce shrinking thereof and compress layer 18 onto the conduit surface. The hoop stress forces generated by this shrinking are insufficient to overcome the lap peel strength of the already amalgamated strips 14 and 16. Hence, a reliable, environmentally sealed sleeve is generated.

Figure 2:
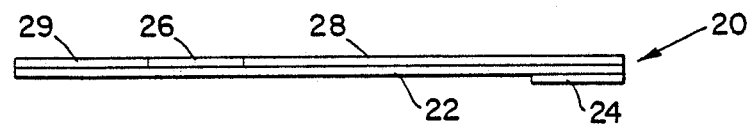
FIG. 2 illustrates an end view of a second embodiment of the invention.
Figure 3:
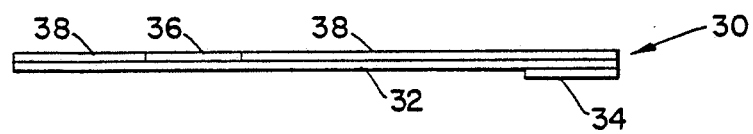
FIG. 3 depicts an end view of yet a third embodiment of the invention.

FIGS. 2 and 3 illustrate alternative structures employing the same materials and principals disclosed above. Sleeve 20 provides a further element for environmentally sealing the bond between strips 24 and 26. In this case, strip 26 is offset from the edge of sheet 22 and hot-melt adhesive 29 is coated onto the peripheral edge. The remaining surface of sheet 22 is coated with mastic 28.

The embodiment depicted in FIG. 3 is similarly manufactured except that the entire upper surface of sheet 32 is coated with hot-melt adhesive 38 whereby the environmental seal between the conduit and sleeve 30 can be effected only upon application of heat after amalgamation of strips 34 and 36.

Figure 4:
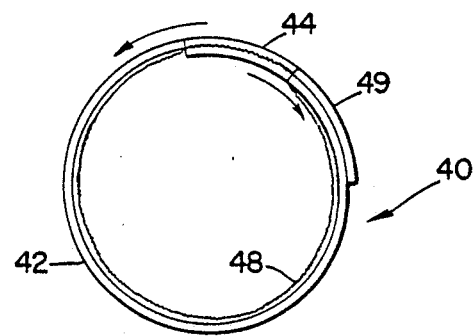
FIG. 4 represents the actuated closure sleeve of either of the embodiments illustrated in FIGS. 2 or 3.

FIG. 4 represents finished, installed sleeve 40 which employs the sealng element described in FIGS. 2 and 3. When strips 24 and 26 or 34 and 36 are pressed together forming fused joint 44, lap 49 extends beyond fused joint 44 thereby protecting joint 44 from direct environmental exposure. In the case of FIG. 2, layer 48 is mastic which flows onto the conduit surface and upon heating to induce shrinking in the direction of the arrow, lap 49 bonds to the outer surface of sheet 42. If sleeve 30 of FIG. 3 is employed, layer 48 is a hot-melt adhesive and it flows only upon heating.

Modification of these embodiments and alternatives should now be readily evident to the skilled artisan. Accordingly, those modifications are intended to fall within the spirit and scope of the invention as defined by the following claims:

I claim:

1. A wraparound closure for conduit protection, comprising:
   (a) a substantially planar sheet of plastic material having shape memory, being heat recoverable at transition temperature T°, and having upper and lower surfaces;
   (b) a mastic layer disposed on the upper surface of said sheet, said layer being composed of an adherent material selected from the group of mastic and heat-activated adhesives being activated at a temperature below T°, said adherent material being coated on the upper surface of said sheet;
   (c) a first strip of self-amalgamating material partially crosslinked by exposure to a radiation dose of less than approximately 4 Mrad disposed on and integrated with said upper sheet surface where said self-amalgamating material and said adherent material are of substantially equal thickness to provide a continuous layer on said upper surface of substantially uniform thickness, said self-amalgamating material being capable of fusing together without application of heat thereto,
   (d) a second strip of self amalgamating material partially crosslinked by exposure to a radiation dose of less than approximately 4M rad complementary to said first strip positioned on and integrated with said lower sheet surface to mate and fuse with said first strip when said sheet is wrapped around a tubular conduit and said first and second strips are juxtaposed and pressed together where application of heat to a temperature of T° causes said sheet to shrink about the conduit and the adherent material bond thereto, and the lap peel strength of the fused first and second strips is sufficient to exceed the hoop stress and lap shear imparted from the heat recovery of said plastic sheet.

2. A wraparound closure according to claim 1 where said sheet is capable of a cylindrical configuration and when so configured is oriented to radially shrink about the cylindrical axis and where said first and second strips are disposed perpendicular to the direction of orientation thereof and parallel with the direction of the cylindrical axis.

3. A wraparound closure according to claim 2 where said first and second strips are more than 1 inch in width.

4. A wraparound closure according to claim 1 wherein said second strip is disposed along one edge of the lower surface of said sleeve and the first strip is offset from the opposite edge of said sheet whereby the opposite edge of said upper surface is capable of overlapping a portion of said lower surface when wrapped into a cylindrical configuration.

5. A wraparound closure according to claim 4 further comprising a layer of hot-melt adhesive disposed between said first strip and opposite edge of said upper surface.

* * * * *